Dec. 23, 1969        R. D. WEBB         3,484,967
APPOINTMENT BOARD
Filed Oct. 11, 1967
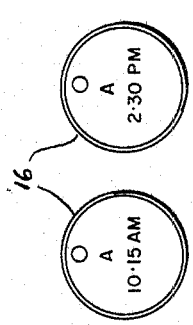
INVENTOR
Robert D. Webb

United States Patent Office 3,484,967
Patented Dec. 23, 1969

3,484,967
APPOINTMENT BOARD
Robert David Webb, Box 271, Esterhazy,
Saskatchewan, Canada
Filed Oct. 11, 1967, Ser. No. 674,519
Int. Cl. G09f 3/18
U.S. Cl. 40—19.5                                1 Claim

ABSTRACT OF THE DISCLOSURE

An appointment board for use in barber shops and the like comprising a board whereon the business time of the day is indicated every fifteen minutes by a hook, there being a row of hooks for each barber, a tag suspended from each hook bearing the name of a barber and the corresponding time of day indicated by the hook, another area of the board having a row of hooks for each barber and tags bearing the name and time of regular standing appointments suspended from said last row of hooks.

This invention relates to new and useful improvements in appointment boards. The present invention comprises a board whereon the business time of the day is indicated every fifteen minutes or thereabouts and where each employee taking appointments is listed and each name is denoted by a letter of the alphabet or a numeral. At the extreme left of the board, an area is reserved for patrons demanding a regular standing appointment at the same time on the same day of each week.

It is to be noted that the board is provided with a hook, at every regular interval, during the business hours of a working day for each employee of the establishment and a tag, indicating the corresponding time is suspended from each hook. Since, in some areas shops are opened from 9 a.m. to 9 p.m., the board is provided as such with a cutting line showing the end of the board for areas where shops are opened from 9 a.m. to 6 p.m. Of course the hours indicated on the board can vary with business practice and by laws governing areas.

The primary object of the invention is therefore the provision of an appointment board whereby a customer enters the establishment and removes the tag on which is indicated the time of the day on which he wishes his appointment.

Another object is to provide an appointment board with an area reserved for regular standing appointment whereby a customer can reserve his appointment for a certain time on the same day of each week.

Another important object is the provision of an appointment board which provides an improved service to customers and eliminates the waiting time in such establishments as barbers, etc.

With these and other objects in view that may appear as the description proceeds, the invention consists in the novel arrangement of the board on which appears the name of every barber (in the case where the appointment board is used in a barber shop).

In the accompanying drawing:

FIGURE 1 is a front elevational view of an appointment board constructed in accordance with the present invention.

FIGURE 2 is an end elevational view of FIGURE 1.

FIGURE 3 is an illustration of tags normally used on each hook of the board.

FIGURE 4 is a personalized tag used in conjunction with the area at the left of the board.

FIGURE 5 is another form of personalized tag.

Referring more in detail to the drawing in which similar reference characters designate corresponding parts throughout the several views, it will be seen the invention comprises an appointment board 10 on which is indicated the names 11 of every barber employed in the establishment and a letter of the alphabet or a numeral 12 alongside each name.

A time table 13, indicating the hours of a normal working day, each hour divided in quarters and a hook 14 secured to the board on each of said hour and quarter hours and a tag suspended on each hook, the tag bearing the letter or numeral denoting the barber concerned and the time of the day corresponding to the hook on which the tag is placed. Such a tag is illustrated in FIGURES 3, 4 and 5 of the accompanying drawing.

Since the laws in certain areas compel commercial establishments to close at 6 p.m. the board can terminate at 6, as indicated by dotted line 10a or extend until 9 p.m. or such time as laws permit. The board can also provide areas 10c for advertising purposes. That section of the board can be easily removed when it is not required since it is attached to the regular board by means of straps 10d as illustrated in FIGURE 2.

At the extreme left of the board is an area 15 reserved for regular standing appointments. For example, if a regular customer desires an appointment with Bob as illustrated on the board every Friday at 4:30 p.m. he would be provided with a tag 15a bearing his name, day and time, and every Friday morning Bob would remove the tag from area 15 and place it on the proper hook after removing the regular tag 16.

A still further type of personalized tag 17, is shown in FIGURE 5. This type of tag would be used by persons living in different cities, who frequently travel. This type of tag is always retained by the customer and is placed on the board for an appointment later on in the day.

In operation the board is used as follows:

Every morning, each of the barbers listed on the board inspects the tags in his corresponding line, and if any are for appointments on that day, he removes the regular tag 16 from the board and replaces it with the personalyzed tag 15a at the proper time of the day.

In addition to the tags in area 15 the board is completely filled with regular tags 16, one for every fifteen minutes. When a client comes in, if he wishes to retain the services of a particular barber he removes from the board the tag corresponding to the time of day on which he desires his appointment, and returns at that time and presents his tag to the barber concerned.

It will be seen from the foregoing that I have provided a new and novel appointment board which will greatly increase the efficiency of the service and reduce to a minimum the waiting period for every client.

Not only will the efficiency of service be increased; but also the quality of service in barbershops. With the use of the personalized tag and the appointment boards a regular customer of a barber, who obtains an unsatisfactory hair cut at another barbershop where the appointment board is in use, will be able to report this fact to his regular barber and the barbers' association can then take appropriate action to remedy sub-par work of barbers. In this way a beter and more uniform quality of service will be fostered.

Although throughout the description I have limited the appointment board to the barbering trade I wish it to be clearly understood that the board could be used as efficiently with any other type of business where appointments are of benefit to the customer.

The embodiments of the invention in which an exclusive property or privilege is claimed are defined as follows:

I claim:

1. An appointment board comprising a sheet of substantially rigid material divided into two main areas, one of said areas provided with a time table on which is indicated the normal hours of a working day divided into fifteen minute periods, a hook secured to each of said periods, the name and designation therefore of every employee working for a firm in which the board is used, and a tag suspended on each hook, said tag bearing the designation of the employee and the corresponding time of the day of the hook on which it is suspended, said second area reserved for regular standing appointments and provided with a hook for each day of the week for each employee listed on the first mentioned portion of the board and personalyzed tags bearing the name of a client, the day of the week and the time of the appointment and a further personalyzed tag bearing the name of the client and the city in which he resides, all of said tags made of substantial material and provided with an aperture through which they are suspended on said hooks and an additional area detachably secured to said board for the purpose of providing advertising areas.

References Cited

UNITED STATES PATENTS

| | | | |
|---|---|---|---|
| 131,399 | 9/1872 | Hoglen | 40—19.5 |
| 2,512,485 | 6/1950 | Cougias | 40—19.5 |
| 2,965,978 | 12/1960 | Olson | 40—19.5 X |

EUGENE R. CAPOZIO, Primary Examiner

WENCESLAO J. CONTRERAS, Assistant Examiner